US011323524B1

(12) United States Patent
Gussin et al.

(10) Patent No.: US 11,323,524 B1
(45) Date of Patent: May 3, 2022

(54) SERVER MOVEMENT CONTROL SYSTEM BASED ON MONITORED STATUS AND CHECKOUT RULES

(71) Applicant: Amazon Technologies, Inc., Seattle, WA (US)

(72) Inventors: Bradley Joseph Gussin, Seattle, WA (US); Jarrod Scott Cameron, Seattle, WA (US); Pratik Pradeep Ramdharne, Seattle, WA (US); Michael Phillip Quinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 16/000,601

(22) Filed: Jun. 5, 2018

(51) Int. Cl.
*H04L 29/08* (2006.01)
*G06F 9/455* (2018.01)
*G06F 9/50* (2006.01)
*H04L 67/51* (2022.01)

(52) U.S. Cl.
CPC .......... *H04L 67/16* (2013.01); *G06F 9/45558* (2013.01); *G06F 9/5061* (2013.01); *G06F 2009/45591* (2013.01); *G06F 2009/45595* (2013.01)

(58) Field of Classification Search
CPC ... G06F 11/1438; G06F 2201/84; G06F 9/485
See application file for complete search history.

(56) References Cited

U.S. PATENT DOCUMENTS

| | | | |
|---|---|---|---|
| 6,496,948 B1 * | 12/2002 | Smorodinsky | G06F 9/505 709/221 |
| 6,681,389 B1 * | 1/2004 | Engel | G06F 8/656 717/173 |
| 9,367,379 B1 * | 6/2016 | Burke | G06F 11/0706 |
| 9,455,879 B1 * | 9/2016 | Mentz | H04L 63/10 |
| 10,795,659 B1 * | 10/2020 | Kinsburskiy | G06F 8/65 |
| 2007/0094294 A1 * | 4/2007 | Ellsworth | G06F 16/256 |
| 2011/0214009 A1 * | 9/2011 | Aggarwal | G06Q 10/063 714/4.11 |
| 2011/0282642 A1 * | 11/2011 | Kruger | G06F 11/3668 703/27 |
| 2012/0030356 A1 * | 2/2012 | Fletcher | G06F 9/5094 709/226 |
| 2012/0066371 A1 * | 3/2012 | Patel | H04L 67/1031 709/224 |
| 2012/0130725 A1 * | 5/2012 | Cooper | G06Q 10/10 705/1.1 |

(Continued)

*Primary Examiner* — Jorge A Chu Joy-Davila
(74) *Attorney, Agent, or Firm* — Nicholson De Vos Webster & Elliott LLP

(57) ABSTRACT

Techniques for server movement control are described. A capacity library service (CLS) can manage which hosts in a provider network can be taken in and out of production. The CLS may also control which entities may remove hosts from production and under what conditions the hosts may be removed from production. In some embodiments, the CLS can execute various workflows to manage checkout and check-in of hosts. Workflows may also be used to manage hosts while they are out of production to manage state transitions (e.g., in production, in testing, in reserve, etc.) based on current host fleet capacity and checkout rules.

20 Claims, 8 Drawing Sheets

(56) References Cited

U.S. PATENT DOCUMENTS

| | | | |
|---|---|---|---|
| 2014/0068040 A1* | 3/2014 | Neti | G06F 9/485 709/223 |
| 2015/0212853 A1* | 7/2015 | Makino | G06F 11/3072 718/103 |
| 2016/0026453 A1* | 1/2016 | Zhang | H04L 67/10 717/171 |

* cited by examiner

```
400 ──┐
      ▼
┌─────────────────────────────────────────────────────────────────┐
│ createLoan {                                                    │
│                                                                 │
│        "Request Date": [timestamp]                              │
│                                                                 │
│        "Checkout Reason": [one or more pre-filled options]      │
│                                                                 │
│        "Requestor ID": [user ID or other credentials]           │
│                                                                 │
│        "Checkout Period": [time period host will be checked out]│
│                                                                 │
│        "Host ID": [list of host identifiers, rack identifiers, etc.]│
│                                                                 │
│        "Host Characteristics": [hardware and/or software identifiers]│
│ }                                                               │
└─────────────────────────────────────────────────────────────────┘
```

- 404: "Request Date": [timestamp]
- 406: "Checkout Reason": [one or more pre-filled options]
- 408: "Requestor ID": [user ID or other credentials]
- 410: "Checkout Period": [time period host will be checked out]
- 412: "Host ID": [list of host identifiers, rack identifiers, etc.]
- 414: "Host Characteristics": [hardware and/or software identifiers]

```
402 ──┐
      ▼
┌─────────────────────────────────────────────────────────────────┐
│ returnLoan {                                                    │
│        "Loan ID": [identifier assigned by CLS to the request]   │
│                                                                 │
│        "Host ID": [list of host identifiers, rack identifiers, etc.;│
│ if empty, all checked-out hosts associated with the identifier to│
│ be returned]                                                    │
│ }                                                               │
└─────────────────────────────────────────────────────────────────┘
```

- 416: "Loan ID": [identifier assigned by CLS to the request]
- 418: "Host ID": [list of host identifiers, rack identifiers, etc.; if empty, all checked-out hosts associated with the identifier to be returned]

FIG. 4

SERVER MOVEMENT CONTROL SYSTEM BASED ON MONITORED STATUS AND CHECKOUT RULES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 4 illustrates an example application programming interface (API) for a server movement control system according to some embodiments.

DETAILED DESCRIPTION

Various embodiments of methods, apparatus, systems, and non-transitory computer-readable storage media for server movement control are described. In various computing environments, physical hosts (also referred to as server computing devices, or just "servers") may be used in different ways for different purposes, and thus may be in different "states." For example, some organizations utilize a "production" pool of hosts that execute customer-facing software (e.g., a website) or are otherwise used by customers (e.g., hosts that execute virtual machines, containers, applications, and/or other code for customers, such as in a provider network). As additional examples, servers may be placed in a "testing" pool of hosts (e.g., to test new software versions before deploying software to production), a "staging" pool of hosts, an "offline" or "in maintenance" pool, etc. In some environments, for example, hosts may be moved from one pool to another. For example, hosts may be removed from production for various reasons, such as for testing, repairs, etc. However, typical computing environments using such host pools (e.g., provider networks) do not provide a way of tracking hosts that are taken out of production, leading to hosts being removed from production and not returned in a timely manner. According to some embodiments, a capacity library service (CLS) can manage which hosts in a provider network can be taken in and out of production. The CLS may also control which entities may remove hosts from production and under what conditions the hosts may be removed from production. In some embodiments, the CLS can execute various workflows to manage checkout and check-in of hosts. Workflows may also be used to manage hosts while they are out of production to manage state transitions (e.g., in production, in testing, in reserve, etc.) based on current host fleet capacity and checkout rules.

Figure 1:
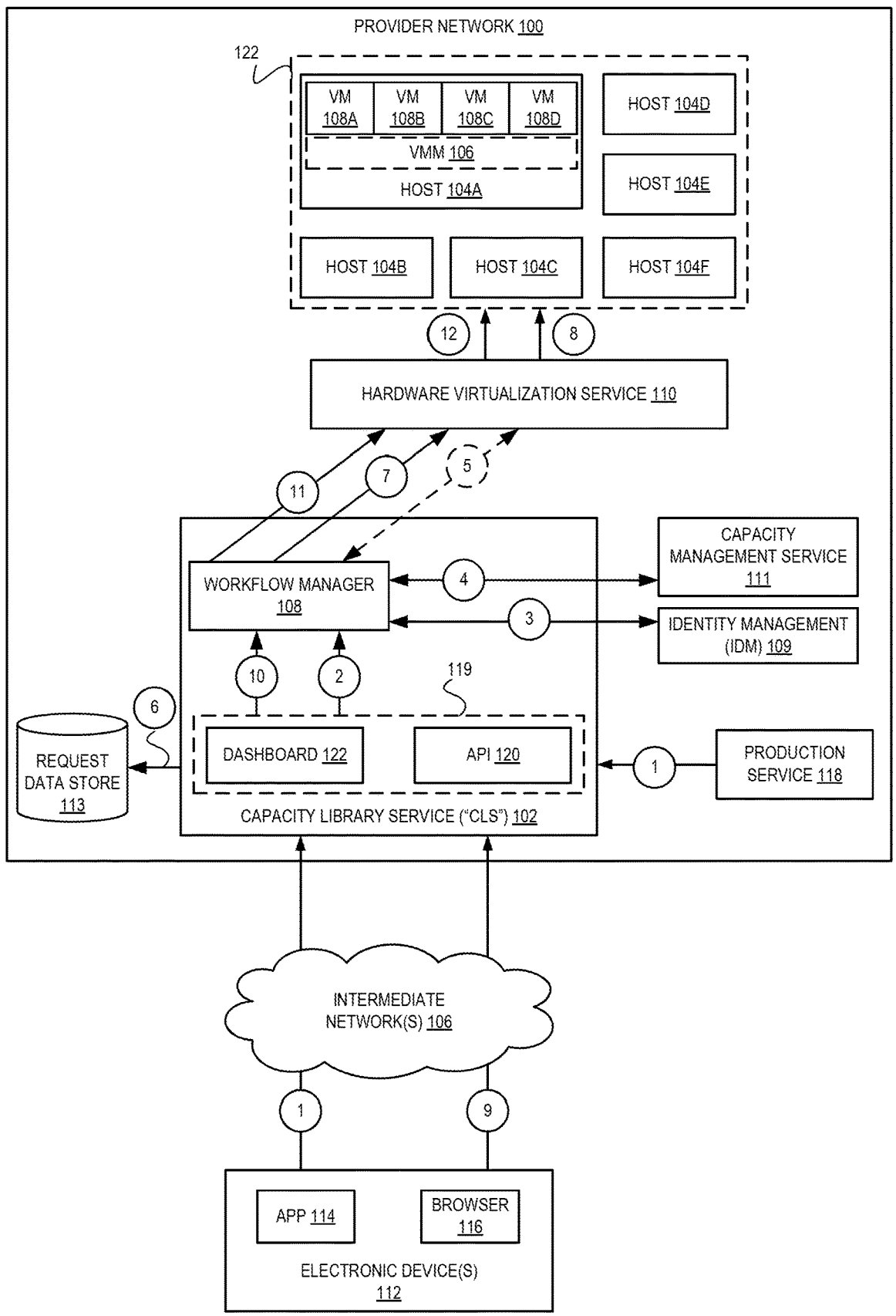
FIG. 1 is a diagram illustrating an environment for server movement control according to some embodiments.

FIG. 1 is a diagram illustrating an environment for server movement control according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Provider network 100 may include hardware virtualization technology that enables multiple operating systems to run concurrently on a host computer (e.g., hosts 104A-104F), i.e. as virtual machines (VMs) 108 on the hosts 104. The VMs 108 may, for example, be executed in virtualization guest locations on the hosts 104 that are rented or leased to customers of a network provider. A hypervisor, or virtual machine monitor (VMM) 106, on a host 104 presents the VMs 108 on the host with a virtual platform and monitors the execution of the VMs 108. Each VM 108 may be provided with one or more local IP addresses; the VMM 106 on a host 104 may be aware of the local IP addresses of the VMs 108 on the host. The provider network 100 may, for example, provide customers the ability to implement virtual computing systems (e.g., VMs 108) via a hardware virtualization service 102.

Hosts 104 in provider network 100 may be in a variety of states, such as production (where the hosts are available to customers of the provider network), preproduction (where the hosts are being prepared to be put into production), and non-production (where the hosts are out of production for a variety of reasons, such as testing, capacity reserves, etc.). The state of hosts 104 in provider network 100 may be managed through a console by internal teams to test services or host features, to add hosts to the provider network, to repair hosts, etc. However, once the testing, repairs, or other reasons hosts have been removed from production have been resolved, the hosts may not be returned to production in a timely manner, reducing the overall production capacity of provider network 100. For example, an engineer or technician who repairs a host may forget to move the host back into the production pool upon the conclusion of the repair. As another example, a software engineer may remove a host from production to use it for testing and/or developing software for a period of time, and similarly forget to put the host back into production upon the conclusion of his or her work. In various embodiments, a capacity library service (CLS) 102 can manage the checkout/check-in process for hosts as well as manage host lifecycle while hosts are out of production. As such, the CLS increases available production capacity of the provider network 100.

CLS 102 may act as a gatekeeper, enforcing checkout rules on entities (e.g., users, services, etc.) seeking to checkout hosts from production. As shown in FIG. 1, a user (e.g., operating electronic device 112) or a service (such as production service 118) can send a request to CLS 102 to checkout out one or more hosts, as shown as numeral 1. Rather than merely processing the request, updating the state of the requested hosts, and sending a notification once the hosts are available in a non-production state, CLS can require particular information related to the checkout request to be provided. For example, a description of why the checkout is being requested, a checkout time period, and/or other information may be required to be provided with the request. In some embodiments, CLS may expose an interface 119, such as API 120 and/or dashboard 122 (e.g., as a web application), through which requests may be made and information about existing checkouts may be viewed and/or retrieved. In some embodiments, the API 120 and/or dashboard 122 may be accessible through a dedicated application 114 and/or web browser 116. In some embodiments, the request may be for multiple hosts to be removed from production. The request may identify the hosts using characteristics of the hosts. These characteristics may include a host identifier (such as an IP address, hostname, MAC address, or other identifier) or rack identifier, or host features (such as amounts of types of hardware resources that the host includes, instance types that the host can execute, etc.). In some embodiments, the host or hosts may be requested using a host query that identifies particular hosts that meet characteristics defined in the query (e.g., processor type, number of processors, amount of memory, etc.). When a request is made for multiple hosts, the request may be set to all-or-nothing (e.g., the request succeeds if all hosts can be removed from production, but fails if one or more requested hosts are unable to be removed), or the request may be set for as-many-as available (e.g., when at least one or more of the hosts are available the request succeeds with respect to the available hosts). In some embodiments, requests may be processed by CLS 102 in the order in which they are received. In some embodiments, requests may include a priority indicator and may be processed based on their priority.

After receiving a request for a checkout, at numeral 2, CLS can invoke a workflow manager 108. Workflow manager 108 may execute various checkout and check-in workflows which may perform tasks prior to checking the host out of production or into production. For example, a capacity check can be performed before moving a host from production to a non-production state to determine whether enough hosts exist that can be moved out of production, whether enough available hosts would remain in production (assuming that the request is satisfied) to satisfy an available capacity threshold, etc. In various embodiments, production capacity (also referred to herein as "capacity") may include all production hosts available through a provider network or all production hosts in from a specific fleet of hosts. A fleet of hosts may include a plurality of hosts in a provider network which are designated to a specific customer, end user, internal team, etc.

In some embodiments, the requestor can be authenticated with an Identity Management (IdM) 109 system, as shown at numeral 3, to determine whether the requestor is authorized to remove the host from production. Although IdM 109 is shown as part of provider network 100, in various embodiments, IdM 109 may be an external identity management and/or authorization service such as a lightweight directory access protocol (LDAP) service or other directory service. Different users may be authorized to perform different actions. For example, some systems, users, or groups of users may be whitelisted to check out hosts on a long-term basis. For example, maintenance teams may require long-term checkouts to perform extended maintenance and upgrades, to retire hosts, etc. Similarly, testing and preproduction teams may require long-term contracts for some hosts to perform host testing for specific applications being rolled out, to test new hosts or host types prior to introducing the hosts into production, or other testing purposes. As such, the checkout time period can be authorized by the IdM. Other restrictions, such as time of day of checkout, checkout purpose, number of hosts being requested, etc. may be managed as permissions for users, groups of users, or other entities and enforced using IdM 109.

At numeral 4, if the requestor has been successfully authorized by IdM 109, workflow manager 108 can determine whether the fleet of hosts has sufficient capacity to remove the request host(s) using capacity management service 111. Capacity management service 111 can receive identifiers for the host(s) requested and determine if sufficient capacity exists in the fleet of hosts (e.g., provider network, a subset of hosts belonging to the requestor, etc.) for the requested host(s) to be removed without impacting current or future performance. As discussed, in some embodiments, the specific identifiers of a requested host may not be known, instead the host may be requested based on its hardware and/or software characteristics. In such an embodiment, at numeral 5, the workflow manager can query hardware virtualization service 110 for host(s) that match the requested host characteristics. The hardware virtualization service 110 may identify matching hosts and return host identifiers to be passed to capacity management service 111. If the capacity management service 111 determines that there is insufficient capacity, then the request may fail (e.g., leading to the capacity management service 111 returning a response message to the workflow manager 108 indicating a denial of the request), or the capacity management service 111 may instead indicate (e.g., in a response) that some but not all of the requested hosts may be removed. In some embodiments, the request may include an indication that the capacity check is not to be performed. If such an indication is present, the capacity check can be considered to be successful without requesting data from capacity management service 111.

In some embodiments, additional tasks may be performed. For example, a request may be received for hosts that are not yet deployed in the fleet of hosts. Some users or other entities may be authorized to request future hosts that have not yet been deployed. When a request comes in the workflow may perform an inventory validation to determine whether the requested hosts exist. If the requested hosts do not exist, the workflow can continue to run until the request is canceled or until a time when the requested hosts have been deployed. At that time, the request can then be fulfilled by removing the requested hosts from production. Such a future checkout request may include a rack identifier or host characteristics as discussed above. In some embodiments, the workflow may be implemented as a finite state machine.

In some embodiments, at numeral 6, request information can be stored to a request data store 113 (e.g., by the workflow manager 108 and/or capacity library service 102). The request data store 113 may include a database, object data store, or other local or distributed storage device or storage service. CLS 102 may store the checkout reason and other data included in the checkout request in request data store 113. This data may be used to keep track of the current state of the hosts and why the hosts have been checked out. Additionally, workflows may be executed to identify hosts at the end of their checkout period (or after the checkout period has expired) and notify users that the checkout period is ending or return expired hosts to production.

At numeral 7, once the tasks have been successfully performed, the workflow manager 108 can request hardware virtualization service 110 to remove the requested host(s) from production. At numeral 8, the hardware virtualization service 110 can update the state of the requested hosts to remove the hosts from production and/or other necessary databases or systems that keep track of the status of the hosts. In some embodiments, if the request is rejected, a message can be returned to the requestor indicating why the request was rejected. For example, if one of the tasks fail, such as due to insufficient capacity, the message may indicate which task failed and one or more reasons why the task has failed.

The requested hosts may be returned to production automatically at the expiration of the checkout period and/or upon receipt of a request from the requestor to return the host(s) to production, as shown at numeral 9. In some embodiments, the request to return the host(s) may be to return all checked out hosts to production, or a portion of the checked-out hosts to production. For example, if four hosts have been checked out, the request to return the hosts to production may identify three to be returned and one to be extended. In some embodiments, one or more notifications may be sent to the requestor prior to return of the hosts to production (e.g., an amount of time before the end of the checkout period of time, such as one week, one day, one hour, etc.) to warn the requestor of the upcoming return, and optionally the requestor may be provided the ability to approve/confirm the return, request an extension of the checkout, etc. In some embodiments, the hosts may be returned to production automatically upon expiration of the checkout.

Before a host is returned to production, a workflow may be executed to ensure the host is safe to reenter production, as shown by a request issued by the capacity library service 102 to the workflow manager 108 at numeral 10. The workflow manager 108 may execute one or more check-in workflows to determine, for example, whether the returning hosts have any active instances and/or customer data on them, whether repairs on the host have been completed, whether the host is to be rebuilt with different instance slots, etc. In some embodiments, the specific check-in tasks performed may depend on the reason for which the host was checked out. For example, if the host was checked out for reserved capacity and kept in isolation, the host may be returned to production without additional check-in tasks. Once the check-in tasks have been performed successfully, at numeral 11 a request is sent to hardware virtualization service 110 to return the host(s) to production. At numeral 12, the state of the hosts(s) can be updated and the host(s) may be returned to production.

In some embodiments, while a host is checked out, CLS 102 may also monitor the capacity of the host fleet 122. If capacity drops below a configurable threshold, the CLS may automatically return checked out hosts to production to increase capacity. In some embodiments, the request may indicate whether the host(s) may be returned to production automatically if the capacity drops below the threshold or whether the requestor is to be notified prior to returning the hosts to production. Once capacity has returned to a level above the threshold, any hosts that were returned to production may again be removed from production and made available to the requestor. In some embodiments, the checkout period of time may be extended automatically based on the amount of time the host(s) were returned to production to meet capacity. In some embodiments, CLS 102 may generate reports at a configurable frequency. The reports may indicate a list of hosts checked out, when each host is due to expire, etc.

In some embodiments, a checkout request may be made for a host that is already checked out by another entity. The host may remain in the possession of the other entity until their checkout period expires or the host is requested to be returned to production. The host may then be checked out to the new requestor rather than being returned to production. In some embodiments, the check-in and checkout workflows may be performed prior to transferring control to the new entity (e.g., to remove any active instances or data that are on the host from the previous entity).

Figure 2:
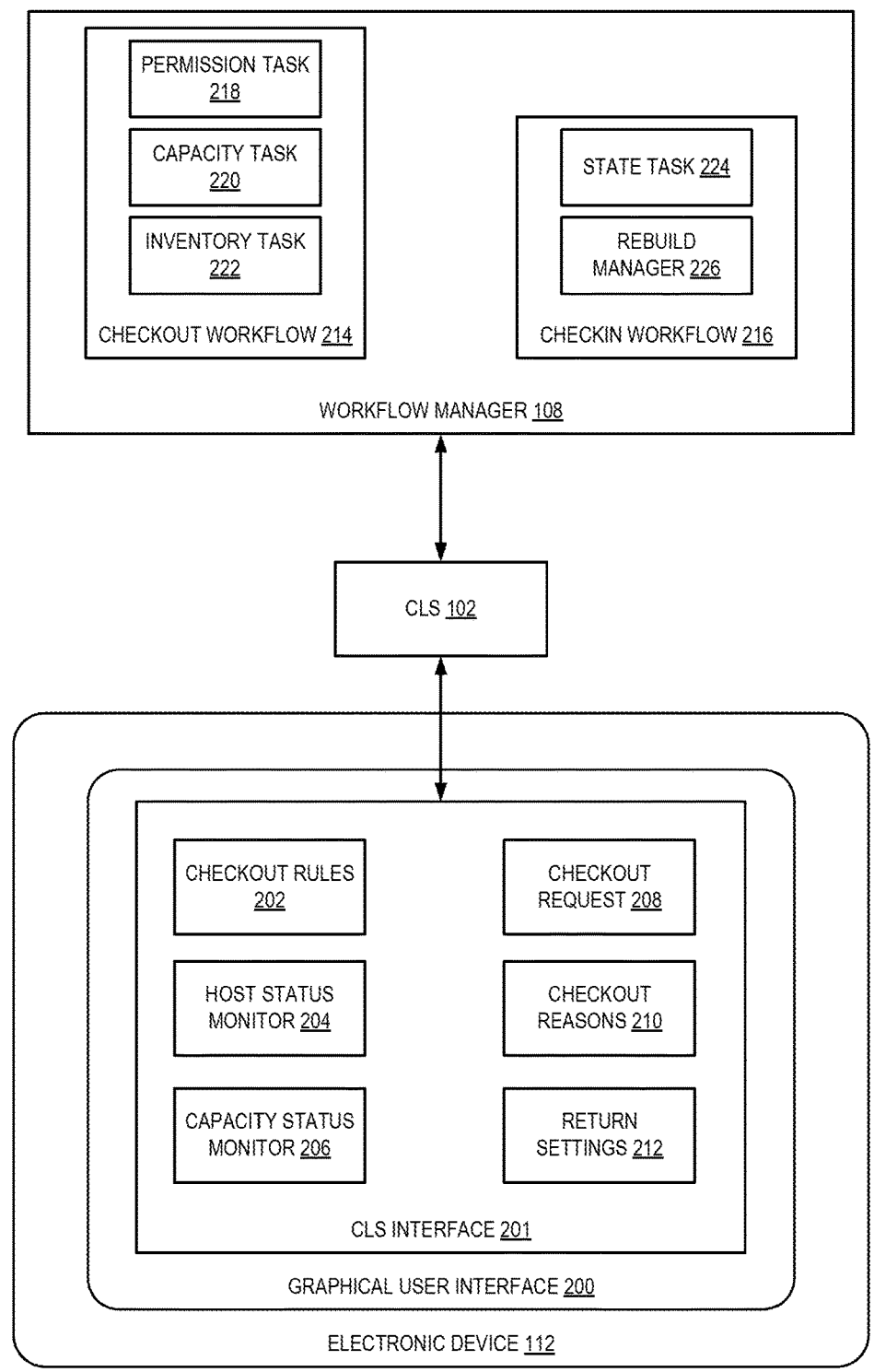
FIG. 2 is a diagram illustrating an environment for server movement control according to some embodiments.

FIG. 2 is a diagram illustrating an environment for server movement control according to some embodiments. As shown in FIG. 2, an electronic device 112 may include a graphical user interface (GUI) 200, such as CLS interface 201, through which CLS 102 may be accessed. As discussed, the GUI may access the CLS 102 through an API, a web interface, or other interface. The GUI may be implemented as a standalone app, a web browser, or other application. In some embodiments, the app may be a thin application executing on the electronic device to access a dashboard or other interface in provider network 100. Although the embodiment of FIG. 2 is shown with a GUI, other interfaces such as APIs may be used as discussed herein.

In some embodiments, a customer may define one or more checkout rules 202 through GUI 200. The rules may define checkout timing (e.g., time of day, day of week, etc.). In some embodiments, the rules can define the capacity threshold described above, which may be used to determine whether a host can be checked out or if a host needs to be returned to production. In some embodiments, the capacity threshold may be defined based on quality of service (QoS), buffering time, etc. In some embodiments, authorization rules may be provided through the GUI, the authorization rules indicating which users or groups of users may checkout hosts, how many hosts, etc. Rules may be provided as policies, a JavaScript object notation (JSON) object, or other format.

In some embodiments, host status monitor 204 can provide reports at a configurable frequency or upon request. The reports may indicate a list of hosts checked out, when each host is due to expire, etc. In some embodiments, capacity status monitor 206 can indicate a real-time and/or projected capacity of a fleet of hosts.

In some embodiments, a customer can create a checkout request 210 using GUI 200. The customer can enter request data, such as host identifiers and/or host characteristics, checkout time period, etc. In some embodiments, the customer can select checkout reasons 108 from a list of options such as testing, repair, reserve, etc. The customer can also set return settings 212. The return settings may include opting in to return checked out hosts automatically when the load expires and/or automatically return hosts if capacity drops below the threshold defined in checkout rules 108.

As discussed, CLS 102 can invoke checkout workflows 214 and check-in workflows 216 on workflow manager 108. When an entity requests to checkout a host CLS can perform checkout workflows which may include various tasks. As discussed, the checkout tasks may include a permission validation workflow 218 can be executed to authenticate/authorize a requestor with an IdM. A capacity validation workflow 220 can be performed to check whether sufficient capacity exists to check out the requested hosts. Additionally, an inventory validation 222 can be performed to determine whether the requested hosts exist. if the customer returns a droplet/loan expires, it may still have instances running on it that the customer forgot to terminate we would want to force quit those instances by calling recovery systems or reaping them to reclaim the droplets. In some embodiments, the hosts can be checked to determine whether any instances have been launched on the requested host prior to removing the host from production.

In some embodiments, when the host is being returned to production a check-in workflow 216 can be executed depending on the current state of the host. For example, if the state of the host can be checked 224. If the state indicates that the host was isolated or otherwise reserved and not used, then the host may be returned to production. If the host was in use (e.g., for testing, etc.), then rebuild manager 226 may be called to remove any active instances or user data from the host prior to returning the host to production. If the host state was "repair" then a workflow may be executed to confirm that repairs or other maintenance have been completed. In some embodiments, the various checkout and check-in tasks can be performed asynchronously. The tasks may be performed in any order or in a customer specified order.

Figure 3:
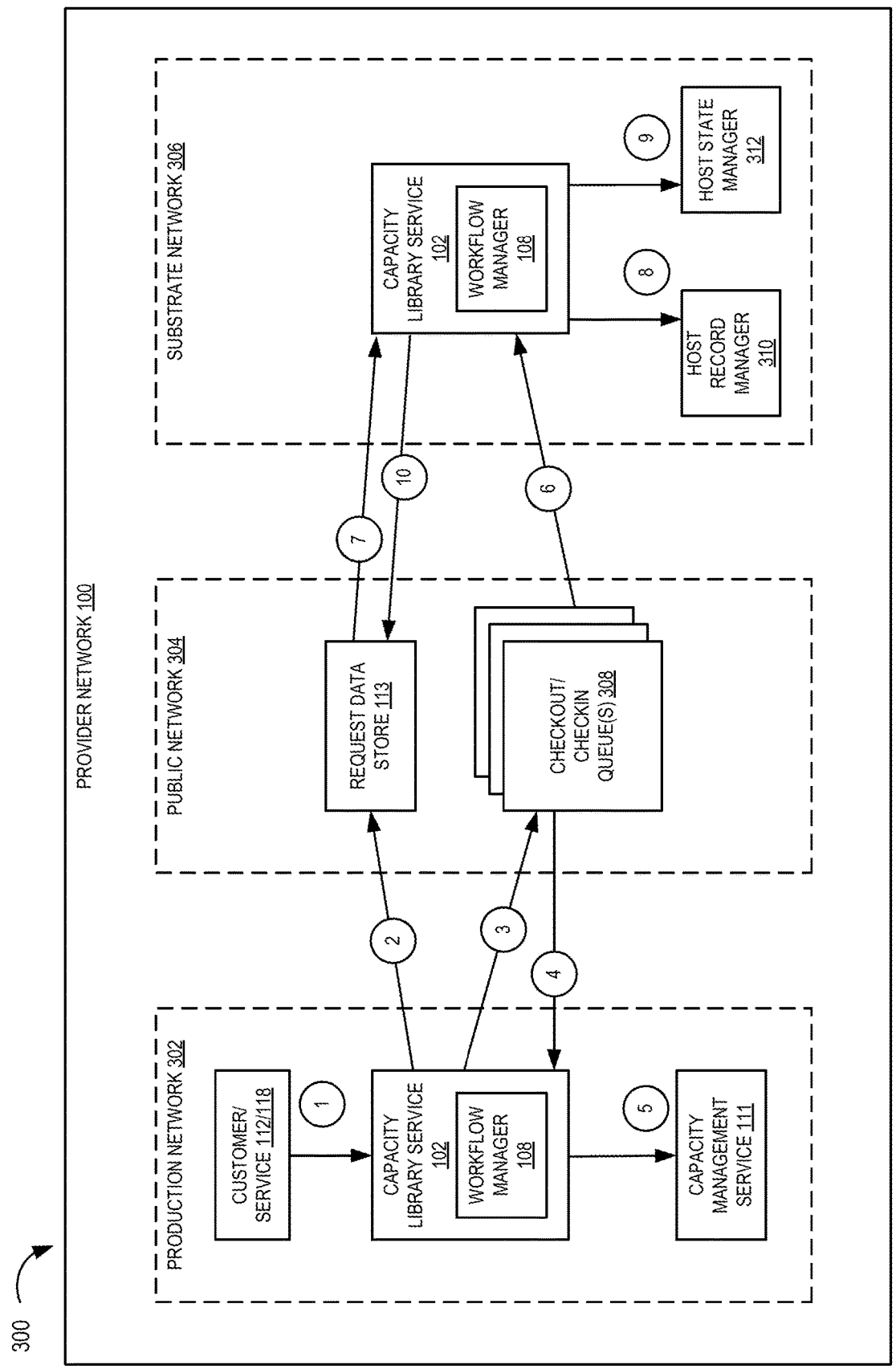
FIG. 3 is a diagram illustrating a server movement control system architecture according to some embodiments.

FIG. 3 is a diagram illustrating a server movement control system architecture according to some embodiments. As shown in FIG. 3, architecture 300 may include a production network 302 which may include various hosts that are currently in production, a public network 304 which may provide services such as data storage and queueing services, and a substrate network 306 which may manage the physical hosts, including those in production state and those in a non-production state. At numeral 1, a new checkout request can be sent from a customer or service (e.g., from electronic device 112 or production service 118). At numeral 2, the CLS can store request data in a data store 113. A checkout table, or other data structure, can be generated using information included in the request, and the checkout table may be stored to request data store 113. In some embodiments, CLS 102 can assign a checkout identifier to the request and add it to the checkout table in addition to the information included in the request. At numeral 3, a message including the checkout identifier can be added to checkout/check-in queues 308. In some embodiments, a plurality of queues 308 can be maintained in which each queue corresponds to a different task being managed by workflow manager 108. For example, the queues 308 may include a capacity validation queue, an inventory queue, a state queue, etc. As checkout requests are processed by CLS, workflow manager 108 (both the instance in production network 302 and the instance in substrate network 306) can dequeue tasks and perform the tasks asynchronously.

At numeral 4, workflow manager 108 can dequeue a job from queue 308 and, at numeral 5, can perform a capacity validation with capacity management service 109. As discussed above, the job may be dequeued from a capacity validation queue from queues 308. As discussed, workflow manager 108 may perform additional validations, such as an inventory validation and permission validation.

At numeral 6, an instance of CLS in substrate network 306 can dequeue a job from queue 308. As discussed, this job may be dequeued and performed asynchronously from the job described above with respect to FIG. 4. Checkout information associated with the job dequeued at numeral 6 can be retrieved from request data store 113 at numeral 7 using a checkout identifier associated with the dequeued job. Workflow manager 108 in CLS 102 in substrate network 306 can then perform additional tasks. For example, at numeral 8 a host record manager 310 can be called to determine whether the requested host(s) have been deployed and exist in production network 302. At numeral 9, host state manager 312 can be called to determine whether the host(s) are in an expected state and whether the host state can be changed to non-production. Once all tasks have been successfully performed, CLS 102 can update the checkout data in request data store 113 to indicate that the checkout of the hosts is now active, as shown at numeral 10. In some embodiments, once all tasks have asynchronously completed, the requested hosts can be removed from production.

FIG. 4 illustrates an example application programming interface (API) for a server movement control system according to some embodiments. As shown in FIG. 4, an example API as described herein may include a createLoan instruction 400 and a returnLoan instruction 402. The createLoan instruction 400 can include a request date 404 which may include a timestamp generated when the request is created. A checkout reason 406 may be provided. The checkout reason may include a selection of one or more pre-filled options (e.g., testing, capacity reserve, repair, etc.). The createLoan instruction may also include a requestor ID, such as a user ID or other credential associated with an IdM. A checkout period 410 may also be defined. The checkout period may be in hours, days, months, etc. In some embodiments, if no checkout period is specified a default checkout period (e.g., one week, one month, etc.) may be used. Additionally, the host or hosts being requested may be identified by a host identifier 412 (or rack identifier) or by host characteristics 414 (e.g., hardware type, instance type, etc.).

In some embodiments, the returnLoan instruction 402 may include a loan identifier 416. This may be the checkout identifier described above assigned by the CLS when the checkout is requested. In some embodiments, the returnLoan instruction 402 can include host identifiers 418 for the host or hosts being returned. As discussed, a portion of the checked out hosts may be returned. In some embodiments, if no hosts are specified, then all hosts associated with the loan ID can be returned.

Other APIs may include a describeLoan API that may be used to determine a status of the loan or loans associated with a particular user, account, or other entity. In some embodiments, describeLoan may be used to search for hosts and their loan status by checkout identifier, host identifier, checkout reason, and/or checkout time period. In some embodiments, a repairHost and/or rebuildHost API may be made available through CLS to initiate repair and/or rebuild workflows for specified hosts. For example, prior to returning a host to production that has been used for testing, rebuildHost may be called to initiate the rebuild process. The rebuildHost API may receive one or more host identifiers and a rebuild type (e.g., number of instance slots to be on the rebuilt host, etc.). In some embodiments, if a host is being removed from production to perform repairs, a repairHost API can be called to initiate the repair workflow for the host or hosts after the host or hosts has been removed from production.

Figure 5:
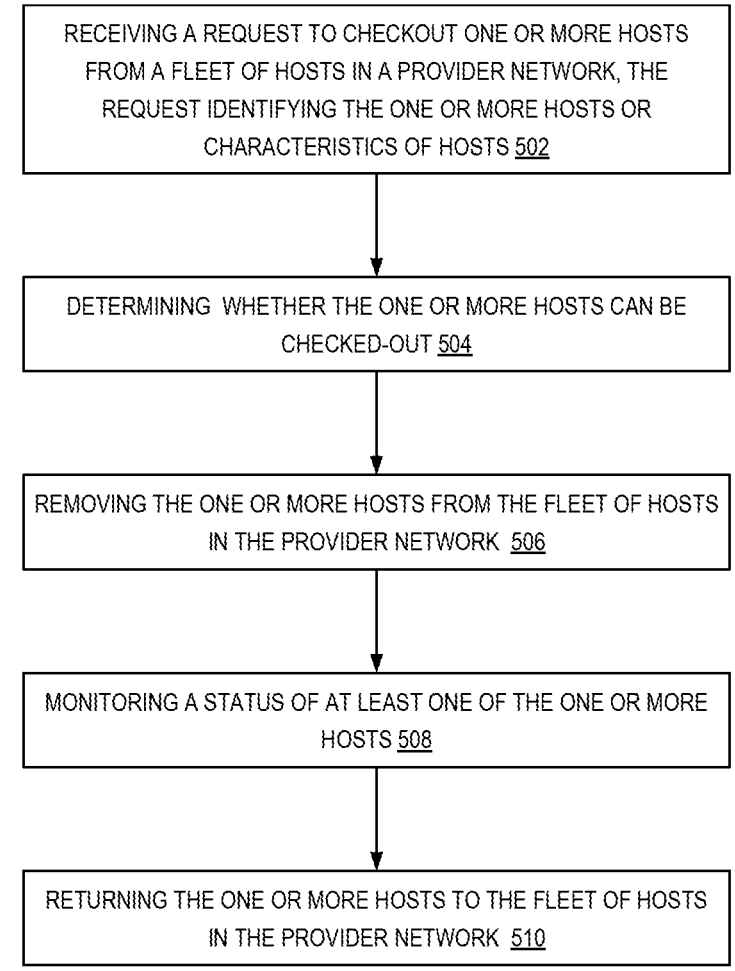
FIG. 5 is a flow diagram illustrating operations for a method of server movement control according to some embodiments.

FIG. 5 is a flow diagram illustrating operations 500 for a method of server movement control according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by capacity library service 102 and/or workflow manager 108 of the other figures.

The operations 500 include, at block 502, receiving a request to checkout one or more hosts from a fleet of hosts in a provider network, the request identifying the one or more hosts or characteristics of hosts. In some embodiments, the request identifies the one or more hosts using at least one of a host identifier, a rack identifier, a host type identifier, or a host query.

The operations 500 include, at block 504, determining whether the one or more hosts can be checked-out. In some embodiments, determining may include executing a workflow to perform at least one task on the one or more hosts, the at least one task comprising one or more of a capacity validation, a permission validation, and a launch validation. The operations 500 include, at block 508, removing the one or more hosts from the fleet of hosts in the provider network.

The operations 500 include, at block 506, monitoring a status of at least one of the one or more hosts. In some embodiments, the operations 500 may further include causing a graphical user interface (GUI) to be displayed, the GUI indicating one or more of current checkout activity, one or more checkout rules, or current capacity data for the provider network. Monitoring a status of the one or more hosts may further include receiving one or more checkout rules through an interface (e.g., an API, GUI, or other interface as discussed above), and applying the one or more checkout rules to the status of the one or more hosts during a checkout period. In some embodiments, an available capacity of the provider network can be determined to be below a threshold defined by the one or more checkout rules. At least one of the one or more hosts can be returned to the fleet of hosts based at least on the one or more checkout rules. In some embodiments, the request to checkout one or more hosts includes a notification preference, the notification preference indicating whether a notification is to be sent prior to the one or more hosts being returned to the fleet of hosts The operations 500 include, at block 510, returning the one or more hosts to the fleet of hosts in the provider network. In some embodiments, returning the one or more hosts to the fleet of hosts may include receiving a request to return the one or more hosts, determining the one or more hosts were reserved for testing, and rebuilding the one or more hosts prior to returning the one or more hosts to the fleet of hosts. In some embodiments, returning the one or more hosts to the fleet of hosts may include determining a checkout period of time has expired, sending a notification indicating the checkout period has expired, and receiving an acknowledgement to return the one or more hosts to the fleet of hosts in the provider network.

In some embodiments, the operations 500 may include receiving a request to checkout one or more hosts from a production fleet in a provider network on behalf of a user, the request including an identifier for each of the one or more hosts, a checkout time period, and a checkout reason. The operations may further include determining that the user has sufficient permissions to checkout the one or more hosts, validating the one or more hosts, wherein validating includes at least determining that there are not any customer workloads currently executing on the one or more hosts, removing the one or more hosts from the production fleet in the provider network, receiving a request to return the one or more hosts to the production fleet before an end of the checkout time period, and returning the one or more hosts to the production fleet in the provider network.

Figure 6:
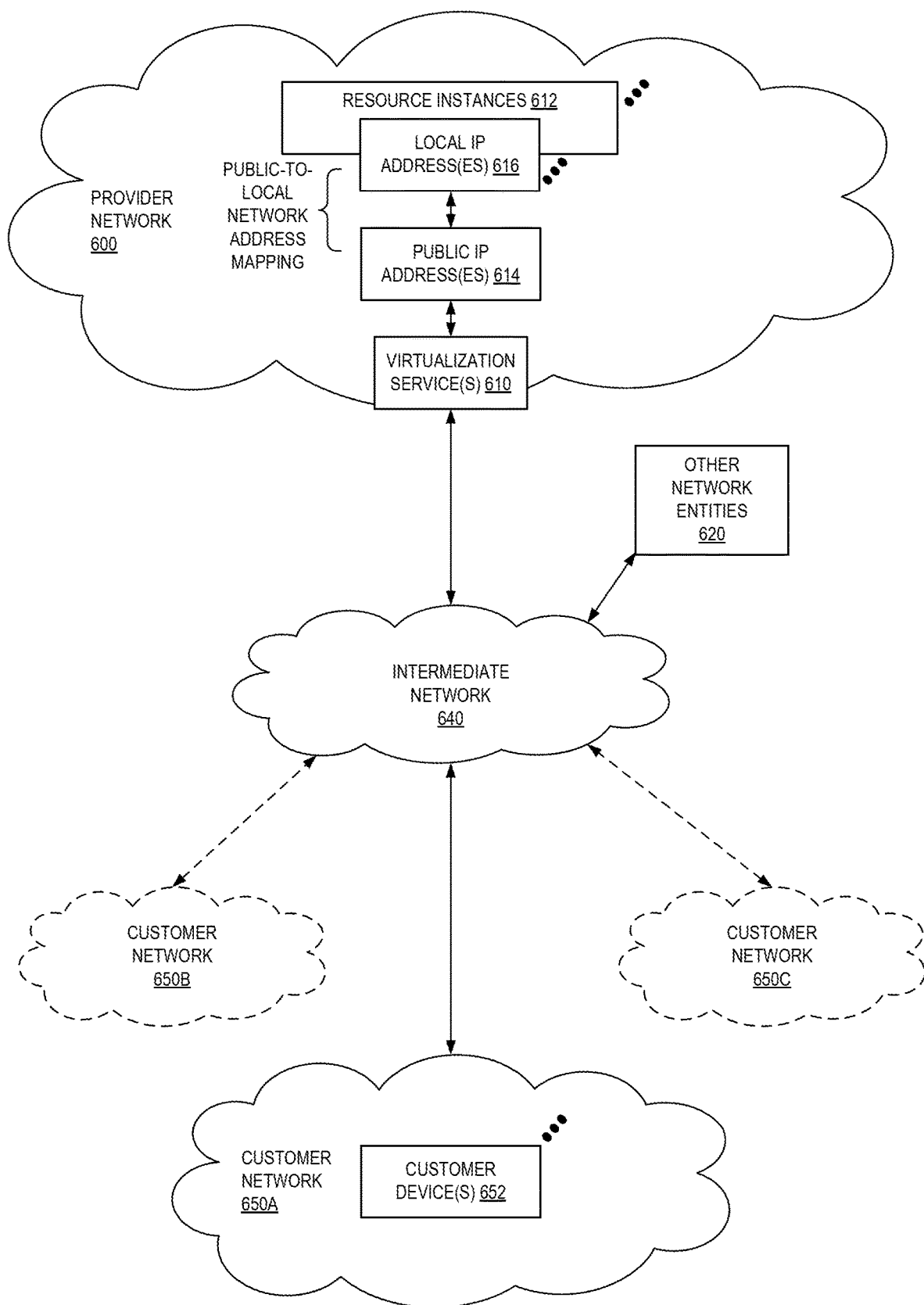
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 7 (IPv6) addresses) that customers may obtain from the provider 600.

Conventionally, the provider network 600, via the virtualization services 610, may allow a customer of the service provider (e.g., a customer that operates one or more client networks 650A-550C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-550C may, for example, implement customer-specific applications and present the customer's applications on an intermediate network 640, such as the Internet. Other network entities 620 on the intermediate network 640 may then generate traffic to a destination public IP address 614 published by the customer network(s) 650A-550C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
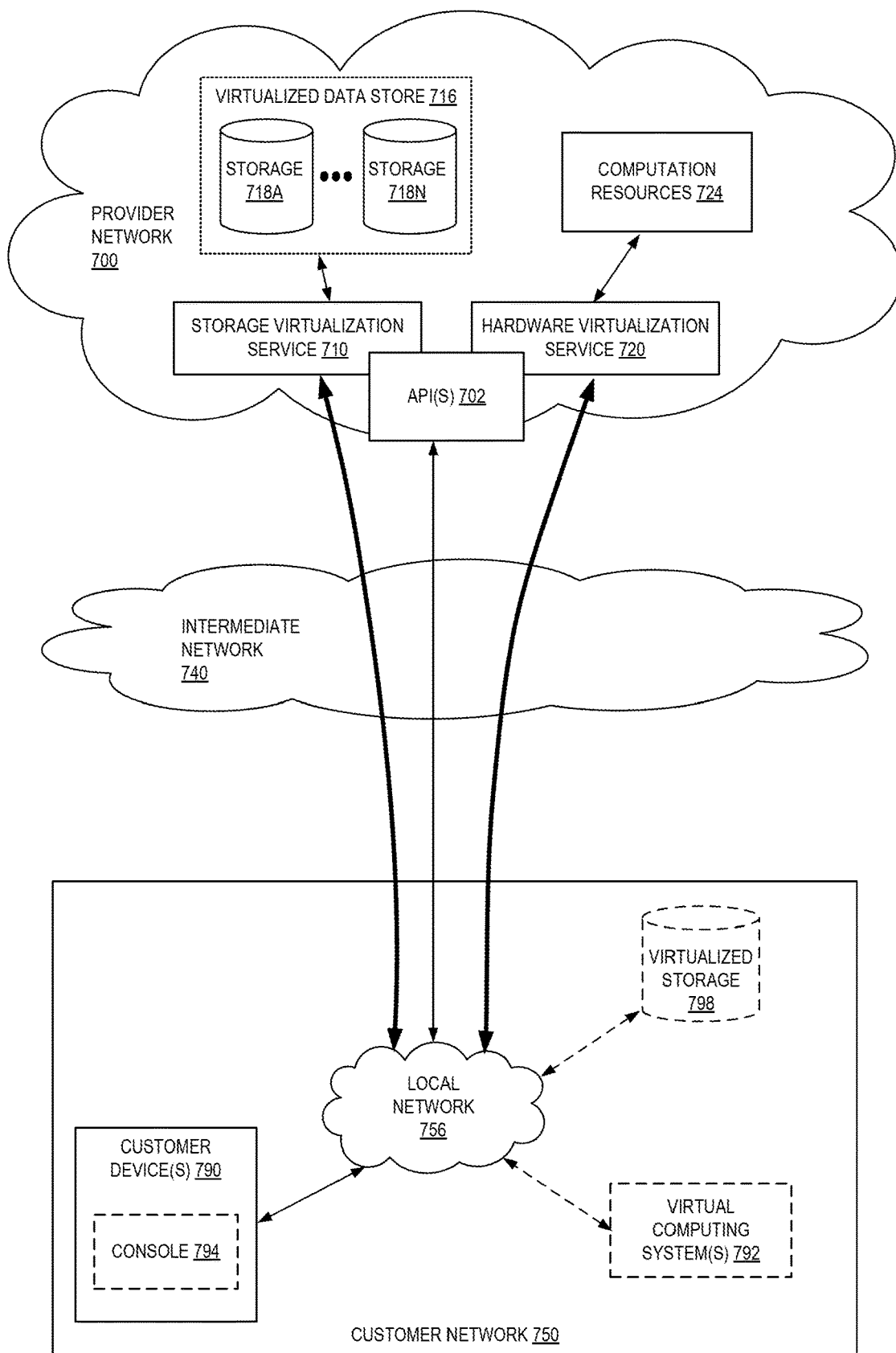
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-618N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
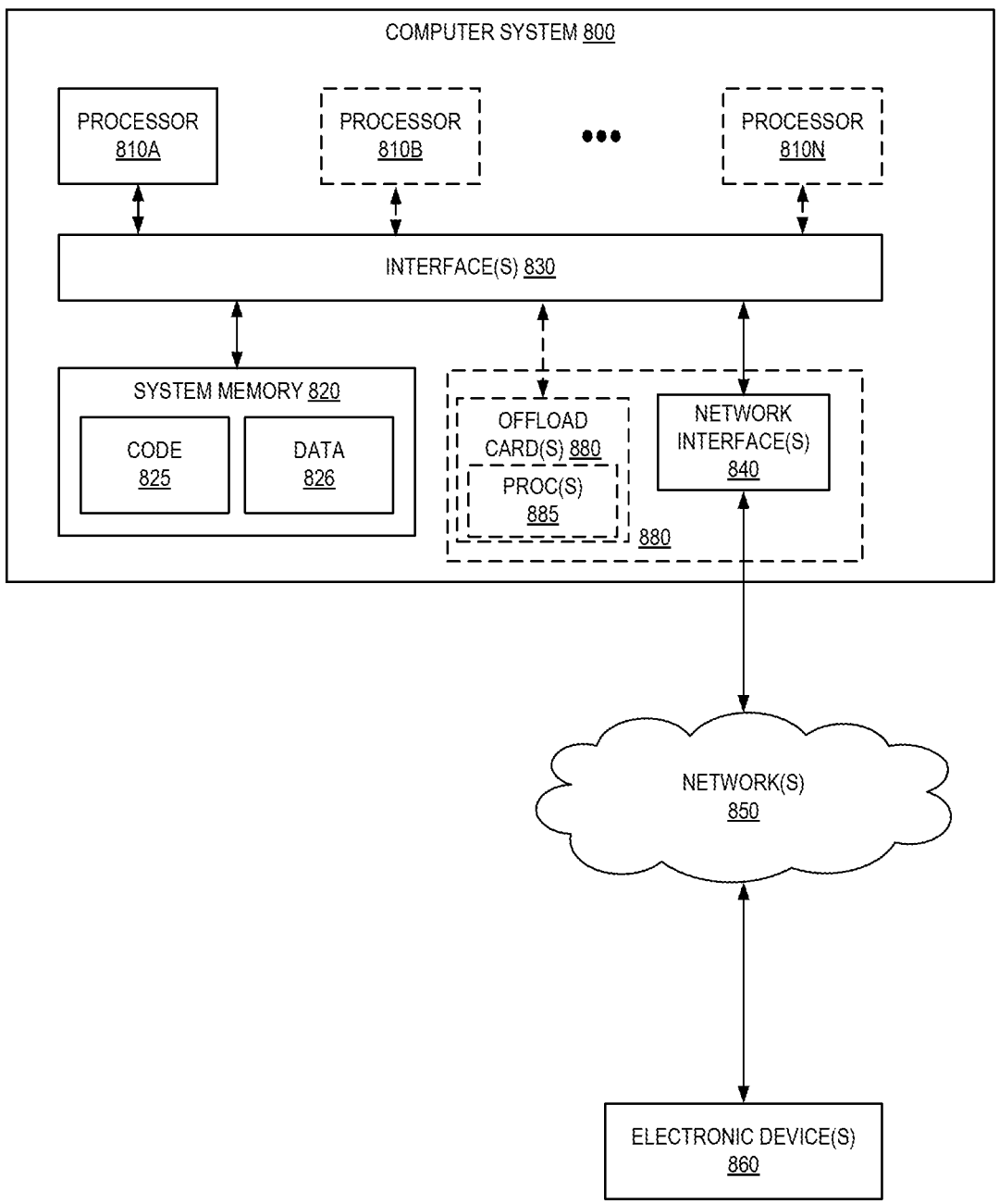
FIG. 8 is a block diagram illustrating an example computer system that may be used in some embodiments.

In some embodiments, a system that implements a portion or all of the techniques for server movement control as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-710N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 104A-104F, 108A-108D, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to checkout a host from a production fleet in a provider network on behalf of a user, the request including an identifier for the host, a checkout time period, and a checkout reason;
   determining that the user has sufficient permissions to checkout the host;
   validating the host, wherein validating comprises determining that there are not any customer workloads currently executing on the host;
   removing the host from the production fleet in the provider network;
   monitoring a status of the host based on a checkout rule;
   determining an available capacity of the production fleet in the provider network is below a threshold defined by the checkout rule;
   determining a checkout state of the host, the checkout state indicating an action performed by or on the host after the host was removed from the fleet of hosts;
   performing a check-in workflow based on the checkout state of the host; and
   returning the host to the production fleet in the provider network based on the checkout rule.

2. The computer-implemented method of claim 1, wherein validating the host further comprises:
   executing a workflow to perform at least one of a capacity validation, a permission validation, and an inventory validation.

3. A computer-implemented method comprising:
   receiving a request to checkout a host from a fleet of hosts in a provider network, the request identifying the host or characteristics of hosts;
   determining whether the host can be checked-out;
   removing the host from the fleet of hosts in the provider network;
   monitoring a status of the host based on a checkout rule;
   determining an available capacity of the fleet of hosts in the provider network is below a threshold defined by the checkout rule;
   determining a checkout state of the host, the checkout state indicating an action performed by or on the host after the host was removed from the fleet of hosts;
   performing a check-in workflow based on the checkout state of the host; and
   returning the host to the fleet of hosts in the provider network based on the checkout rule.

4. The computer-implemented method of claim 3, wherein determining whether the host can be checked-out further comprises:
   executing a workflow to perform at least one task on the host, the at least one task comprising one or more of:
   a capacity validation;
   a permission validation; and
   an inventory validation.

5. The computer-implemented method of claim 3, wherein returning the host to the fleet of hosts further comprises:
   receiving a request to return the one or more hosts;
   determining the host was reserved for testing; and
   rebuilding the host prior to returning the host to the fleet of hosts.

6. The computer-implemented method of claim 3, wherein returning the host to the fleet of hosts further comprises:
   determining a checkout period of time has expired;
   sending a notification indicating the checkout period of time has expired; and
   receiving an acknowledgement to return the host to the fleet of hosts in the provider network.

7. The computer-implemented method of claim 3, wherein the request identifies the host using at least one of:
   host identifier;
   a rack identifier;
   a host type identifier; or
   a host query.

8. The computer-implemented method of claim 3, further comprising:
   causing a graphical user interface (GUI) to be displayed, the GUI indicating one or more of current checkout activity, one or more checkout rules, or current capacity data for the provider network.

9. The computer-implemented method of claim 3, wherein monitoring a status of the host comprises:
   receiving the checkout rule through an interface; and
   applying the checkout rule to the status of the host during a checkout period.

10. The computer-implemented method of claim 9, wherein the request to checkout a host includes a notification preference, the notification preference indicating whether a notification is to be sent prior to the host being returned to the fleet of hosts.

11. A system comprising:
   a first one or more electronic devices to implement a hardware virtualization service of a provider network, the hardware virtualization service comprising physical hosts to execute workloads on behalf of users of the provider network; and
   a second one or more electronic devices to implement a capacity library service, the capacity library service including instructions that upon execution cause the capacity library service to:
      cause a computer graphical user interface to be presented at an electronic device;
      receive a checkout rule via the computer graphical user interface;
      receive a request to checkout a host from a fleet of hosts in a provider network, the request identifying the host or characteristics of hosts;
      determine whether the host can be checked-out;
      remove the host from the fleet of hosts in the provider network;
      monitor a status of the host based on the checkout rule;
      determine an available capacity of the fleet of hosts in the provider network is below a threshold defined by the checkout rule;
      determine a checkout state of the host, the checkout state indicating an action performed by or on the host after the host was removed from the fleet of hosts;
      perform a check-in workflow based on the checkout state of the host; and
      return the host to the fleet of hosts in the provider network based on the checkout rule.

12. The system of claim 11, wherein to determine whether the host can be checked-out, the instructions, when executed, further cause the capacity library service to:
   execute a workflow to perform at least one task on the host, the at least one task comprising one or more of:
      a capacity validation;
      a permission validation; and
      an inventory validation.

13. The system of claim 11, wherein to return the host to the fleet of hosts, the instructions, when executed, further cause the capacity library service to:
   receive a request to return the host;
   determine the host was reserved for testing; and
   rebuild the host prior to returning the host to the fleet of hosts.

14. The system of claim 11, wherein to return the host to the fleet of hosts, the instructions, when executed, further cause the capacity library service to:
   determining a checkout period of time has expired;
   sending a notification indicating the checkout period of time has expired; and
   receiving an acknowledgement to return the host to the fleet of hosts in the provider network.

15. The system of claim 11, wherein the request identifies the host using at least one of:
   host identifier;
   a rack identifier;
   a host type identifier; or
   a host query.

16. The system of claim 11, wherein the instructions, when executed, further cause the capacity library service to:
   cause a graphical user interface (GUI) to be displayed, the GUI indicating one or more of current checkout activity, one or more checkout rules, or current capacity data for the provider network.

17. The system of claim 11, wherein to monitor a status of the host, the instructions, when executed, further cause the capacity library service to:
   apply the checkout rule to the status of the host during a checkout period.

18. The computer-implemented method of claim 1, further comprising:
   causing a computer graphical user interface to be presented at an electronic device; and
   receiving the checkout rule via the computer graphical user interface.

19. The computer-implemented method of claim 3, further comprising:
   causing a computer graphical user interface to be presented at an electronic device; and
   receiving the checkout rule via the computer graphical user interface.

20. The computer-implemented method of claim 19, further comprising:
   receiving the threshold defined by the checkout rule via the computer graphical user interface.

* * * * *